Feb. 12, 1946. H. W. SCHOTTENBERG ET AL 2,394,877
ARC WELDING ROD HOLDER
Filed July 26, 1943
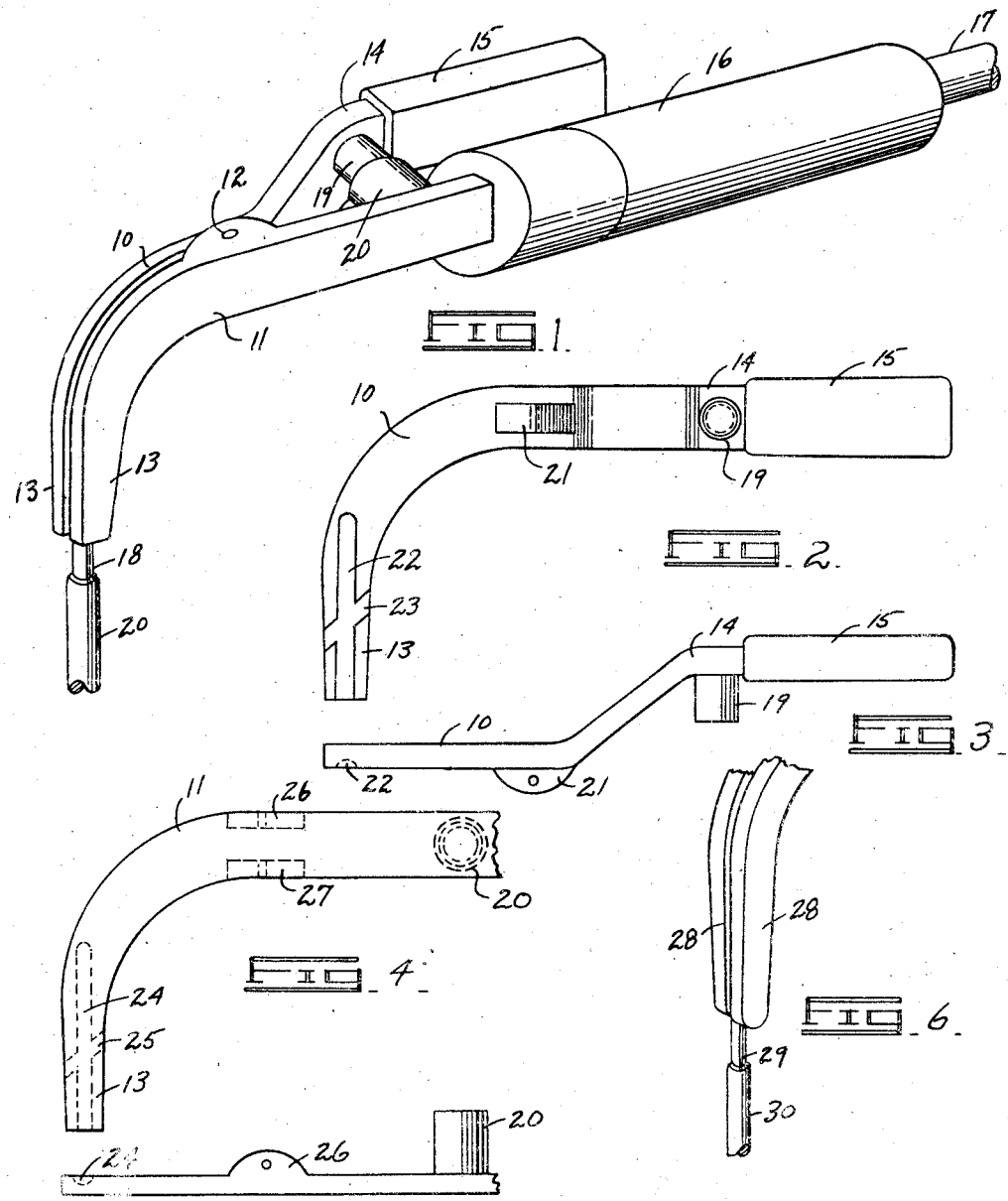
Inventors:
Harold W. Schottenberg &
John J. Volosin
By W. B. Harpman Attorney Patented Feb. 12, 1946

2,394,877

UNITED STATES PATENT OFFICE 2,394,877

ARC WELDING ROD HOLDER

Harold W. Schottenberg, Youngstown, and John J. Volosin, Poland, Ohio

Application July 26, 1943, Serial No. 496,242

1 Claim. (Cl. 219—8)

This invention relates to an improved arc welding rod holder for use in arc welding.

The principal object of the invention is the provision of electrodes forming holders for a welding rod, the holder being formed so as to permit practically full utilization of all of the welding rod.

A further object of the invention is the provision of an arc welding rod holder so formed as to enable it to be brought into close proximity to the work piece without obstructing the welder's view of the same.

A still further object of the invention is the provision of an arc welding rod holder, the electrode portions of which are adapted to securely hold a welding rod in desirable position.

The arc welding rod holder shown and described herein has been designed to enable the more complete utilization of welding rods so as to practically eliminate the stubs which ordinarily result from the use of conventional rod holders. The design varies from the conventional type holder in that the rod gripping portions of the electrodes curve downwardly from the handle portions to form an extension of the holder at an angle to the handle portions thereof, thereby bringing the actual rod holding portions and thereby the rod closer to the work piece and at the same time enabling the operator to obtain an unobstructed view of the weld being made.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a perspective view of the arc welding rod holder showing the uppermost end of a coated welding rod being held thereby.

Figure 2 is a side elevation of one of the electrodes of the arc welding holder shown in Figure 1.

Figure 3 is a top plan view of the portion of the invention illustrated in Figure 2.

Figure 4 is a side elevation with parts broken away illustrating the other one of the electrodes of the device shown in Figure 1.

Figure 5 is a top plan view of the portion of the device shown in Figure 4.

Figure 6 is a perspective view of the rod holding portions of a modified form of welding rod holder.

By referring to the drawing and Figure 1 in particular, it will be seen that a welding rod holder is illustrated and comprises electrodes 10 and 11 pivoted to one another by means of a pivot 12 and adapted to satisfactorily hold a welding rod between the opposing faces thereof, the electrodes 10 and 11 being formed in a curved shape so as to provide a work piece approaching extension 13, which in Figure 1 depends from the remainder of the welding rod holder. The electrode 10 forming one portion of the welding rod holder illustrated in Figure 1 is provided with a curved extension 13 which in turn is provided with a handle comprising an insulating sheath 15 of desirable material. The electrode forming the other portion of the welding rod holder has a relatively larger and preferably rounded handle 16 formed thereabout and suitably attached thereto, the handle 16 being formed of a desirable insulating material. The electrodes 10 and 11 are electrically connected to each other through the pivot 12 and the electrode 11 extends backwardly through the handle portion 16 and makes connection with a current carrying wire 17 so that the electrodes may be energized therethrough. In order that the electrodes will normally tend to firmly hold a coated welding rod such as indicated at 18, a pair of oppositely disposed tubular brackets 19 and 20 are positioned on the inner sides of the electrodes 10 and 11 immediately adjacent the handles 15 and 16 and are adapted to telescopically engage one another and form suitable positioning means for a tensioning device such as a coil spring (not shown) which is positioned therein. The welding rod 18, a portion of which is shown being held by the rod engaging extensions 13 of the welding rod holder, is a conventional coated rod, the coating being indicated by the numeral 20.

By referring to Figures 2 and 3 of the drawing the formation of the electrode 10 may be seen and it will be observed that the electrode 10 is provided with an offset hinge portion 21 which is drilled to receive the pivot 12 heretofore referred to. The extension 13 forming the lowermost portion of the curved outward end of the electrode 10 is provided with desirable rounded grooves 22 and 23 which in conjunction with matching grooves 24 and 25 on the curved extension 13 of the electrode 11 form suitable means for satisfactorily holding a welding rod.

The electrode 11 is illustrated in Figures 4 and 5, the handle portion 16 being broken away. The electrode 11 is provided with a pair of offset hinge portions 26 and 27 which are drilled to receive the pivot 12. In this connection it will be seen that the offset hinge portions 26 and 27 enable the offset hinge portion 21 of the electrode 10 to be positioned therebetween so that the pivot 12 properly registers with the drilled openings therethrough and forms a workable hinge structure which satisfactorily conveys electric energy from the electrode 11 which is in connection with the wire 17, to the electrode 10.

In Figure 6 a modification of the curved extensions 13 of the welding rod holder may be seen wherein the curved extensions of the holder is indicated by the numeral 28, it being observed that the depending portions of the extensions 28 are relatively longer and relatively smaller in cross section than those heretofore described and illustrated in Figure 1. A coated welding rod 29 is shown in position between the opposed faces of the depending extensions 28 in the modification, the coating of the rod being indicated by the numeral 30.

It will thus be seen that an arc welding rod holder has been disclosed wherein the jaw portions of the electrodes are formed in a curving extension at an angle to the plane of the handle members thereof so as to enable a welding rod positioned between the lowermost portions of the curving extensions of the electrodes to be held in position closer the work piece than would otherwise be the case. Further, it will be seen that the curving formation of the electrodes form a welding rod holder which enables the operator to obtain an improved degree of visibility of the weld being made.

Having thus described our invention, what we claim is:

In an arc welding rod holder including a pair of electrodes positioned side by side and hinged to each other and having handles formed thereon, the handle of one of the members spaced horizontally from the handle of the other member and having spring means positioned therebetween normally urging the handles apart so as to urge rod holding portions thereof together, a downturned jaw structure comprising matched curved relatively long extensions formed on the electrodes and terminating in relatively smaller tapering rod holding members having means formed on their opposing surfaces for engaging the said welding rod.

HAROLD W. SCHOTTENBERG.
JOHN J. VOLOSIN.